(12) United States Patent
Teramoto et al.

(10) Patent No.: US 6,565,148 B1
(45) Date of Patent: May 20, 2003

(54) ASSEMBLY STRUCTURE FOR COWL LOUVER

(75) Inventors: Yasunobu Teramoto, Nakashima-gun (JP); Tetsumi Ichioka, Mie-gun (JP); Daiichiro Kawashima, Ichinomiya (JP); Yasuo Shibuya, Yokkaichi (JP); Kazutoshi Ikeda, Okazaki (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/659,462

(22) Filed: Sep. 11, 2000

(30) Foreign Application Priority Data

Sep. 10, 1999 (JP) .......................................... 11-256840
Sep. 29, 1999 (JP) .......................................... 11-276128
Dec. 24, 1999 (JP) .......................................... 11-367550

(51) Int. Cl.[7] ............................................... B62D 25/08
(52) U.S. Cl. ........................ 296/192; 296/194; 296/93; 180/69.2
(58) Field of Search ............................... 296/192, 154, 296/187, 24.1, 146.9, 93, 76, 201, 96.21, 194; 180/69.2

(56) References Cited

U.S. PATENT DOCUMENTS

| 4,718,712 | A | * | 1/1988 | Nakatani ..................... 296/192 |
| 4,909,566 | A | * | 3/1990 | Hashimoto et al. ........... 296/192 |
| 5,531,496 | A | * | 7/1996 | Zbinden et al. ............. 296/96.21 |
| 5,553,912 | A | * | 9/1996 | Kubina et al. ................ 296/192 |
| 6,193,305 | B1 | * | 2/2001 | Takahashi .................... 296/192 |

FOREIGN PATENT DOCUMENTS

| JP | 359186779 A | * | 10/1984 | .................. 296/194 |
| JP | 401218920 A | * | 9/1989 | .............. 296/96.21 |

* cited by examiner

Primary Examiner—D. Glenn Dayoan
Assistant Examiner—Greg Blankenship
(74) Attorney, Agent, or Firm—Posz & Bethards, PLC

(57) ABSTRACT

A holding part of a cowl inner panel is disposed below a hood seal part of a cowl louver main body away therefrom by a predetermined distance, and the hood seal part is deformed by the impact force of a predetermined size or larger from the hood panel so as to reduce the deformation load on the hood panel. In the case impact force of a predetermined size or larger is applied on the hood panel, the impact force is transmitted to the hood seal part so that the hood seal part is deformed. Accordingly, the hood panel can be deformed drastically so that the impact to be applied from the hood panel onto the opposite party of the collision can be alleviated. Further, both end parts of a seal main body made from an elastic soft material, having a substantially U-shaped cross-section is fixed with a cowl louver and a flat plate part, respectively as well as the cowl louver and the flat plate part are fixed on the car body directly or indirectly. Since spread of the opening of the seal main body is limited, the restoration force can be realized by both effect of the shape and material in the case the seal main body is contacted with a hood with pressure. Therefore, even in the case heat deterioration is generated, a high sealing property can be maintained owing to the restoration force by the effect of the shape.

17 Claims, 10 Drawing Sheets

ASSEMBLY STRUCTURE FOR COWL LOUVER

BACKGROUND OF THE INVENTION

1. Field of the Invention

The present invention relates to an assembly structure for a cowl louver comprising a soft seal member at an end part for sealing influx of air from an engine room into the cowl louver by elastically contacting with a hood panel covering the engine room of an automobile, with the lower end part held by a cowl inner panel so as to be fixed.

The present application is based on Japanese Patent Applications No. Hei. 11-256840, 11-276128 and 11-367550, which are incorporated herein by reference.

2. Description of the Related Art

FIG. 18 shows a conventional assembly structure for a cowl louver. A cowl louver main body 100 provided between a hood panel 101 and a windshield 102, for covering a wiper motor, or the like so as to improve the design, comprises a small hole group 103 to be the inlet for introducing the outside air into the car room. Moreover, a hood seal part 104 is formed integrally with the front end of the cowl louver main body 100, with a soft seal member 105 held by the hood seal part 104. The engine room and the outside can be sectioned airtight according to the elastic contact of the seal member 105 with the hood panel 101. Accordingly, introduction of the air in the engine room through the small hole group 103 in to the car room can be prevented. Furthermore, a clip 106 is fixed on the lower surface of the hood seal part 104 such that one end of the hood seal part 104 is held and fixed on a holding part 108 of a cowl inner panel 107 by the clip 106. The rear end part at the opposite side with respect to the hood seal part 104 of the cowl louver main body 100 is fixed by gripping the windshield 102.

By assembling the cowl louver main body 100 and the hood seal part 104 as described above, the seal member 105 contacts with the hood panel 101 elastically so as to prevent introduction of the air from the engine room into the car room, and thus introduction of the heat and the bad smell from the engine room into the car room through the cowl louver main body 100 can be prevented.

In the conventional assembly structure for a cowl louver, since the hood panel 101 has a substantially constant thickness and thus cannot be made larger, the position of the seal member 105 is limited to a relatively upper position. Therefore, the position of the holding part 108 for holding the hood seal part 104 of the cowl inner panel 107 is relatively upward so that the seal member 105 and the holding part 108 are located at the substantially same position.

However, in the case the seal member 105 and the holding part 108 of the cowl inner panel 107 are disposed at the substantially same position, since the cowl inner panel 107 has a large rigidity so as not to be deformed, the deformation amount of the hood panel 101 can be substantially the same as the deformation amount of the seal member 105, which is extremely small. Therefore, in a case when a large impact is applied on the hood panel 101, for example, in traffic accident, since the impact energy amount to be absorbed by the deformation of the hood panel 101 is slight, the reaction force from the car body is large so that the impact force onto the other party of the collision is large.

FIG. 16 shows another assembly structure for a cowl louver. A seal member 301 is provided at the tip end of a cowl louver 300, elastically contacting with a hood 400. Moreover, a clip 302 is fixed on the lower surface of the tip end of the cowl louver 300 so that the cowl louver 300 is fixed with the cowl inner panel 303 by the clip 302.

During a run, the seal member 301 is elastically contacted with the hood 400 so as to prevent introduction of the air from the engine room into the car room, and thus introduction of the heat and the noise from the engine room into the car room through the cowl louver 300 can be prevented.

As the seal member 301, those having a hollow shape have been used commonly, being fixed on the cowl louver 300 by an adhesive double coated tape. However, according to the seal member 301, the adhesive force of the adhesive double coated tape can be lowered at a high temperature, and the bonded part can be displaced according to the restoration force of the seal member 301. Moreover, it is often bent at both end parts of the cowl louver so as to be used as a fender seal, but also in the case the bending stress is applied accordingly, the bonded part can be displaced. In the case the bonded part is displaced, since the contact area of the seal member 301 and the hood is changed, the reliability of the sealing property is lowered, and thus it is problematic.

Accordingly, integration of the cowl louver 300 and the seal member 301 is conceivable. For example, as shown in FIG. 17, one comprising a wall-like soft seal member 304 integrally molded with the cowl louver 300 has been proposed. According to the integral mold of the seal member and the cowl louver, the reliability of the sealing property can be improved dramatically as well as since the adhesive double coated tape can be eliminated, the effect of reducing the number of steps in assembly can be achieved.

However, in the case of the integral molding of the seal member with the cowl louver 300, it is difficult to have the seal member in the cylindrical shape as shown in FIG. 16. Therefore, it has been provided in the wall-like shape as shown in FIG. 17. According to the seal member 304 integrally molded with the cowl louver 300, since the seal member 304 has a linear cross-sectional shape, the restoration force by the shape can hardly be expected, and thus the restoration force of the seal member 304 highly responsible for the sealing property, depends mostly on the material of the seal member 304. Even though the wall-like seal member 304 can be molded integrally with the cowl louver 300, it is disadvantageous in that the sealing property is deteriorated in the case the restoration force of the material is lowered due to heat deterioration of the seal member 304.

SUMMARY OF THE INVENTION

The invention has been achieved in view of the circumstances and an object thereof is to alleviate the reaction force to be applied from the hood panel onto the other party of the collision by reducing the deformation load of the hood panel by increasing the deformation of the hood panel when the impact is applied thereto.

Another object of the invention is to provide a seal member capable of being molded integrally with a cowl louver as well as capable of preventing the sealing property deterioration due to heat deterioration.

In order to solve the above-mentioned problems, an assembly structure for a cowl louver according to a first aspect of the present invention comprises a cowl inner panel having a holding part, a cowl louver main body held by the holding part, and a hood seal part having a soft seal member to be contacted elastically with the lower surface of a hood panel, held by the cowl louver main body, wherein the holding part is disposed below the hood seal part sufficiently away therefrom, and the hood seal part is deformed drastically so as to reduce the deformation load on the hood panel in the case downward force of a predetermined size or larger is applied from the hood panel.

According to an assembly structure for a cowl louver of the invention, a holding part of a cowl inner panel is disposed below a hood seal part sufficiently away therefrom. And the hood seal part is deformed drastically so as to reduce the deformation load on the hood panel in the case downward force of a predetermined size or larger is applied from the hood seal part.

In the case impact force of a predetermined size or larger is applied on the hood panel due to the traffic accident, the impact force is transmitted to the hood seal part via a seal part so that the hood seal part is detached or deformed drastically. Accordingly, the reaction force to be applied from the hood panel on the opposite party of the collision can be alleviated.

The distance between the holding part of the cowl inner panel and the seal part can be set optionally according to the purpose, but it is preferably 60 to 70 mm in case a human is supposed to be the opposite party of the collision. Accordingly, the impact on the human head part can be alleviated so that the safety can be improved certainly.

The hood seal part can be plastically deformable or elastically deformable. For example, according to drastic bend of the hood seal part by impact force of a predetermined size or larger from the hood panel, the movement of the hood panel can be allowed. Accordingly, in the case downward force of a predetermined size or larger is applied to the hood seal part, since the further movement of the hood seal part can be allowed owing to the drastic bend of the food seal part, the reaction force to be applied on the other party of the collision can be alleviated.

In order to provide the hood panel movable over the hood seal part owing to the drastic deformation of the hood seal part, for example, the hood seal part can be formed with a soft resin having a predetermined strength so that it can be deformed elastically in the case of a large force applied from the hood panel so as to escape therefrom. Accordingly, the hood seal part supports the hood panel ordinarily, but in the case large force is applied thereto, since the hood seal part is elastically deformed drastically by the pressure from the hood panel so as to escape, the hood panel can be moved over the hood seal part. Accordingly, since further movement of the hood panel is allowed, the reaction force to be applied on the other party of the collision can be alleviated. It is also possible to provide the hood seal part elastically deformably so as to escape in the case large force is applied from the hood panel.

The elastic deformation can be achieved easily by forming a groove, a slit, a thin part, or a bellows part.

As another structure for providing the hood seal part drastically deformably, it is also possible to provide the seal member itself projecting from the hood seal part so as to be drastically deformable. For example, the seal member can be formed with a soft material having a predetermined strength in a projecting configuration so that the seal member supports the hood panel according to the elastic contact ordinarily but the hood panel can move over the seal member according to the drastic plastic deformation or bend of the seal member itself in the case large force is applied thereon. In this case, it is also possible to provide the seal member drastically elastically deformably.

Moreover, it is also possible to form the hood seal part with a soft foamed material so that the movement of the hood panel can be allowed according to the drastic compression of the hood seal part by the impact force of a predetermined size or larger from the hood panel. Accordingly, since the further deformation of the hood panel can be allowed according to the drastic compression of the hood seal part in the case downward force of a predetermined size or larger is applied to the hood seal part from the hood panel, the reaction force to be applied on the opposite party of the collision can be alleviated. The hood seal part can be provided compressable either by the elastic deformation or by the plastic deformation.

It is further preferable that the cowl louver main body has a shape not to interfere with the hood panel when the hood panel is deformed. In the case the hood panel interferes with the cowl louver main body when the hood panel is deformed, the deformation amount of the hood seal part is shrunk so that the effect of alleviating the reaction force to be applied on the opposite party of the collision is lowered. In the case of collision with a human head part with the hood panel, since the colliding angle is supposed to be tilted from the vertical direction by about 25 degrees, the hood panel is to be moved in the direction tilted by about 25 degrees from the vertical direction. Therefore, it is preferable that the wall part provided continuously from the hood seal part of the cowl louver main body is formed with an angle tilted by about 25 degrees from the vertical direction in the state assembled in the car body.

A seal member for a cowl louver according to a second aspect of the present invention capable of solving the problems, disposed along the tip end of the cowl louver so as to be elastically contacted with a hood for sealing the influx of the air from an engine room into the cowl louver, comprises a seal main body made from an elastic soft material, having a substantially U-shaped cross-section with a head part and a pair of leg parts, elongating from both sides of the head part, with the tip end of one of the leg parts fixed on the tip end of the cowl louver, upright from the tip end of the cowl louver, and a flat plate part fixed on the tip end of the other one of the leg parts of the seal main body so as to be fixed on the car body directly or indirectly.

It is preferable that the seal member according to the invention further comprises a hard reinforcing plate for interlocking and holding the tip end of the cowl louver and the flat plate part as well as for covering the opening of the seal main body formed between the pair of the leg parts.

It is further preferable that the reinforcing plate is provided integrally with the flat plate part via a hinge part, and is bent at the hinge part with the tip end engaged with and held by the cowl louver. It is further preferable that the seal main body, the flat plate part, the hinge part and the reinforcing plate are formed by integral molding with the cowl louver.

Moreover, it is also preferable that a projection is provided in the tip end part of the cowl louver and the flat plate part, projecting to the opposite side with respect to the seal main body, with the projection engaged with a hole part provided in the reinforcing plate.

According to a seal member for a cowl louver of the invention, a seal main body has a substantially U-shaped cross-section with a pair of leg parts thereof fixed with the tip end of the cowl louver and a flat plate part independent from the cowl louver, respectively. Moreover, the rear end of the cowl louver and the flat plate part are fixed on the car body directly or indirectly. Therefore, since the spread of the opening of the seal main body is limited, the restoration force according to the seal main body material and the restoration force according to the shape can be realized so that the restoration force can be improved compared with the case of a wall-like seal member as well as the sealing property can be maintained owing to the restoration force according to the shape even in the case the restoration force of the material is lowered due to heat deterioration.

However, depending on the fixing means with respect to the cowl louver and the flat plate part, spread of the opening of the seal main body can be conceivable. Therefore, it is preferable to further comprise a hard reinforcing plate for interlocking and holding the tip end of the cowl louver and the flat plate part. According to the reinforcing plate, spread of the opening of the seal main body can be limited certainly so as to further prevent deterioration of the restoration force. The reinforcing plate needs not cover the entirety of the opening of the seal main body, but it can be bridge-like as long as the cowl louver and the flat plate part can be interlocked so as to prevent separation thereof.

Although the seal main body and the flat plate part can be formed independent from the cowl louver so as to be bonded therewith afterwards, it is preferable to provide them by integral molding. For example, after forming the cowl louver and the flat plate part from the same resin, the compact is replaced in another mold for integral molding of the seal main body from a soft resin.

By fixing the reinforcing plate formed separately so as to interlock the cowl louver and the flat plate part from the opposite side with respect to the seal main body, spread of the opening of the seal main body can further be limited. In order to fix the reinforcing plate so as to interlock the cowl louver and the flat plate part, a clip or a vis can be used, but it is preferable to provide the reinforcing plate integrally with the flat plate part via a hinge part. The hinge part can be provided as a joint, but it is preferable that the hinge part is provided as an integral hinge with the flat plate part and the reinforcing plate molded integrally with the hinge part. Accordingly, the joint can be eliminated so that the number of components can be cut back drastically.

It is further preferable that the reinforcing plate is molded integrally not only with the flat plate part but also with the cowl louver and the seal main body. Accordingly, the number of components can further be cut back so as to further reduce the number of steps in assembly.

In the case the reinforcing plate is provided continuously with the flat plate part via the hinge part, it is preferable to engage and fix the other end of the reinforcing plate with the cowl louver for reducing the number of components. The engaging means is not particularly limited as long as the engagement state cannot be released by vibration, and thus various kinds of engaging means such as engagement by a nail and an engaging hole, can be adopted. Moreover, it is also possible to form a projection in the tip end part of the cowl louver and the flat plate part, projecting to the opposite side with respect to the seal main body, with the projection engaged with a hole part provided in the reinforcing plate for fixing.

The seal main body has a substantially U-shaped cross-section with a head part and a pair of leg parts, elongating from the head part. The head part can have a curved surface or a flat surface. Further, the leg parts can have a curved surface or a flat surface as well. It is also preferable to form a further easily deformable lip part in a portion to be contacted with the hood in order to further improve the sealing property. The seal main body can be made from a rubber in the case it is provided independent from the flat plate part, but it is preferable to use a resin material moldable and fusable with the plat plate part, such as an olefin-based elastomer and a styrene-based elastomer in the case it is molded integrally with the flat plate part.

The cowl louver, the flat plate part and the reinforcing plate can be made from a hard resin, such as a polypropylene, a polyethylene, and a polyamide. Among them, the polypropylene is most preferable since it is inexpensive and has the excellent hinge property.

In order to fix the flat plate part on the car body directly or indirectly, a clip can be used as in the conventional embodiment. In the case the reinforcing plate is provided, since the reinforcing plate is interlocked with the flat plate part, it is also possible to fix the clip on the reinforcing plate and fix the reinforcing plate onto the cowl inner panel via the clip for indirectly fixing the flat plate on the car body. In this case, by forming an elastically deformable nail part, projecting from the reinforcing plate, instead of providing the clip, or by forming a projection on the tip end part of the cowl louver and the flat part, projecting to the opposite side with respect to the seal main body, with the projection engaged with a hole part provided in the reinforcing plate, the clip can be eliminated so as to further reduce the number of components.

Features and advantages of the invention will be evident from the following detailed description of the preferred embodiments described in conjunction with the attached drawings.

DETAILED DESCRIPTION OF THE PREFERRED EMBODIMENTS

Hereinafter the invention will be explained specifically with reference to embodiments.

1st Embodiment

Figure 1:
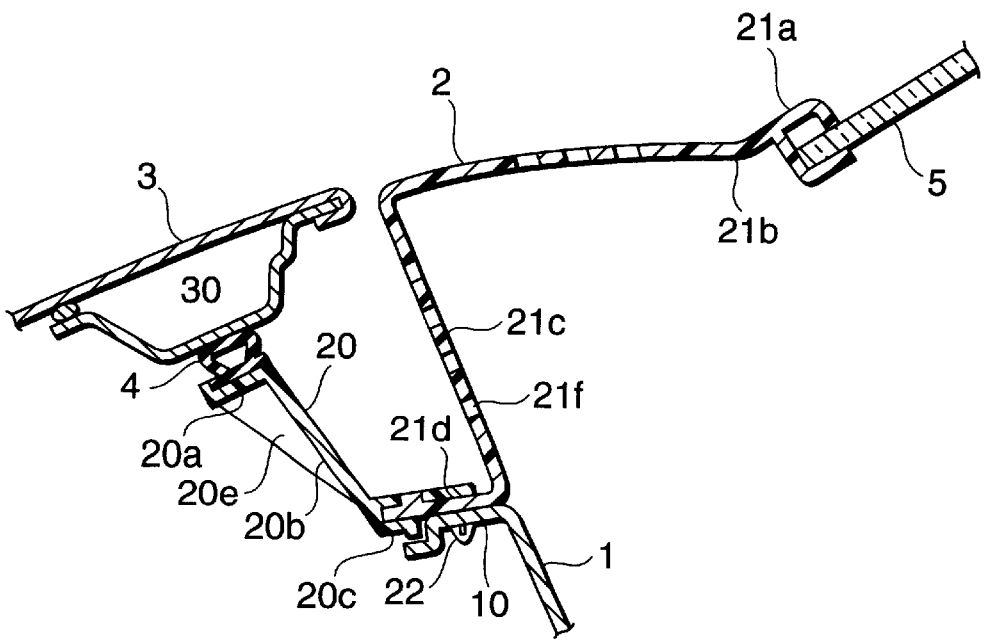
FIG. 1 is a cross-sectional view of an assembly structure for a cowl louver according to a first embodiment of the invention.
Figure 2:
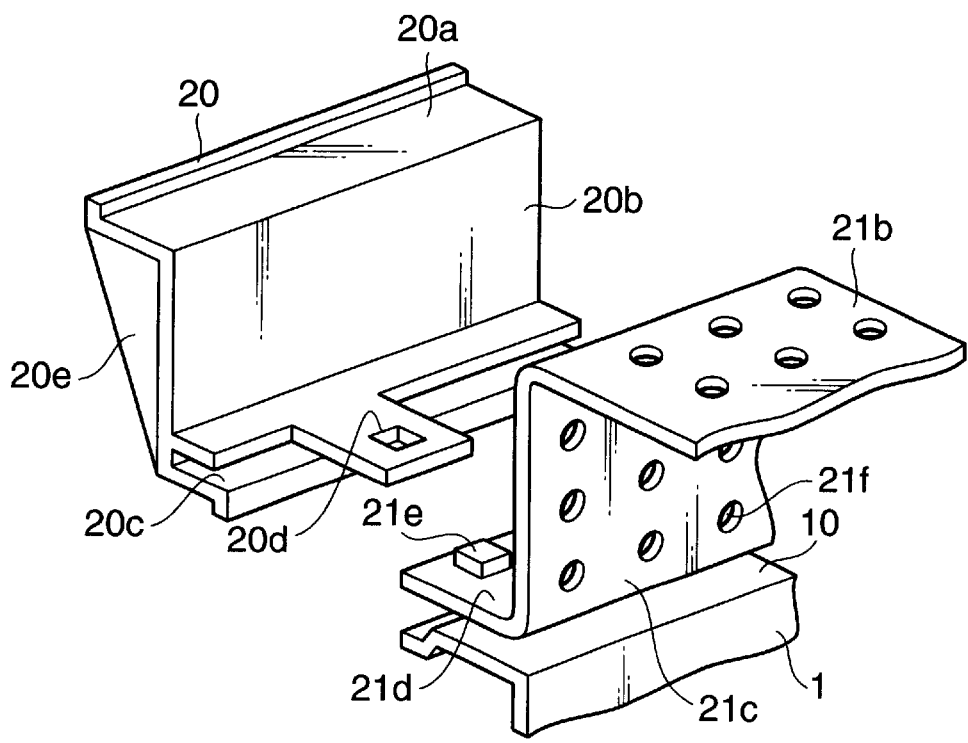
FIG. 2 is a principal part exploded perspective view of the assembly structure for a cowl louver according to the first embodiment of the invention.

FIGS. 1 and 2 show an assembly structure for a cowl louver according to a first embodiment of the invention. The assembly structure comprises a metal cowl inner panel 1, a polypropylene cowl louver main body 2 held by the cowl inner panel 1, a hood seal part 20 held at the tip end of the cowl louver main body 2 as well as held by the cowl inner panel 1, and a rubber soft seal member 4 held by the hood seal part 20, to be contacted elastically with the lower surface of a hood panel 3.

The hood seal part 20 comprises a flat plate-like placing part 20a formed at the tip end, a front tilt part 20b bent substantially by the right angle form the placing part 20a, elongating downward, and a front engaging part 20c having the upper and lower double structure, bent from the lower end of the front tilt part 20b, elongating rearward. The front engaging part 20c is provided with a plurality of engaging holes 20d disposed in the direction perpendicular to the paper surface of FIG. 1 with an interval. The seal member 4 is held by the placing part 20a.

The hood panel 3 made of a steel sheet has a structure with the rear end vertically swayable, and a hollow part 30 formed in the rear end part for reinforcement.

The seal member 4 made from a rubber or a thermoplastic elastomer into a cylinder or an L-shaped cross-section by extrusion molding, is held along the placing part 20a, elongating in the direction perpendicular to the paper surface of FIG. 1. It is compressed by the hood panel 3 in the state with the hood panel 3 closed so as to be elastically deformed and contacted elastically against the lower surface of the hood panel 3 for blocking the air from the engine room. A rib 20e is provided on the rear surface of the placing part 20a and the front tilt part 20b so as to prevent deformation of the placing part 20a according to the pressure from the hood panel 3.

Moreover, the cowl louver main body 2 comprises a gripping part 21a for gripping a windshield 5, a flat plate part 21b elongating forward from the gripping part 21a, a rear tilt part 21c bent substantially by the right angle from the flat plate part 21b, elongating downward, and a rear engaging part 21d, elongating forward from the rear tilt part 21c. A plurality of engaging projections 21e are formed in the rear engaging part 21d in the direction perpendicular to the paper surface of FIG. 1 with an interval. Furthermore, a plurality of through holes 21f are provided in the flat plate part 21b and the rear tilt part 21c so that the outside air can flow into the car room from the through holes 21f. Moreover, the rear tilt part 21c is tilted by about 25 degrees from the vertical direction in the state assembled in the car body.

A holding part 10 is formed on the upper end of the cowl inner panel 1, elongating substantially horizontally. A plurality of through holes (not illustrated) are provided in the holding part 10 with an interval in the direction perpendicular to the paper surface of FIG. 1.

The hood seal part 20 and the cowl louver main body 2 are integrated by engaging the rear engaging part 21d between the front engaging part 20c with the double structure, and fitting the engaging projections 21e into the engaging holes 20d. A plurality of through holes (not illustrated) are provided in the rear engaging part 21d in the direction perpendicular to the paper surface of FIG. 1 with an interval. The hood seal part 20 and the cowl louver main body 2 are fixed with the cowl inner panel 1 by coinciding and fitting a clip 22 with the through holes in the holding part 10.

According to the assembly structure, the distance between the placing part 20a and the holding part 10 is set to be about 60 mm in the vertical direction. Ordinarily the hood seal part 20 supports the load of the hood panel 3 as well as the seal member 4 is elastically contacted with the hood panel 3 for sealing.

In the case impact force of a predetermined size or larger is applied on the hood panel 3 by a traffic accident, the impact force is transmitted to the hood seal part 20 via the seal member 4 so that the engagement between the engaging projections 21e and the engaging holes 20d is released to detach the hood seal part 20 from the cowl louver main body 2. Therefore, the further downward deformation of the hood panel 3 is allowed so that the reaction force to be applied from the hood panel 3 onto the opposite party of the collision can be alleviated certainly according to the force of releasing the engagement of the engaging projections 21e and the engaging holes 22d and the drastic deformation of the hood panel 3.

Furthermore, even in the case the opposite party of the collision collides with the hood panel 3, since the rear tilt part 21c is tilted by about 25 degrees from the vertical direction in the state assembled with the car body, the hood panel 3 can be deformed without interference with the rear tilt part 21c. Therefore, the impact to be applied from the hood panel 3 onto the opposite party of the collision can be alleviated.

2nd Embodiment

Figure 3:
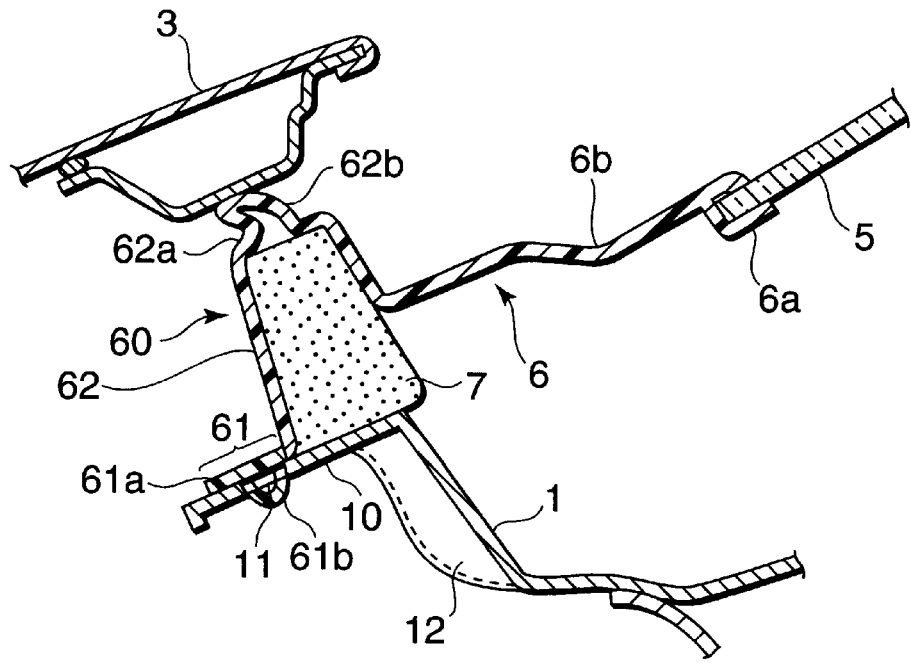
FIG. 3 is a cross-sectional view of an assembly structure for a cowl louver according to a second embodiment of the invention.

FIG. 3 shows an assembly structure for a cowl louver according to a second embodiment of the invention. The assembly structure comprises a metal cowl inner panel 1, a cowl louver main body 6 with one end held by a windshield 5, and a hood seal part 60 formed on the other end of the cowl louver main body 6. The hood panel 3 and the windshield 5 have the same configuration as in the first embodiment.

Moreover, the cowl louver main body 6 made from a hard resin, comprises a gripping part 6a for gripping the windshield 5, and a flat plate part 21b elongating forward from the gripping part 6a. The hood seal part 60 comprises a hard part 61 including a plate part 61a and an elastically deformable clip part 61b projecting from the plate part 61a, and a soft part 62 made from a thermoplastic elastomer having a substantially U-shaped cross-section, to be fixed between the cowl louver main body 6 and the hard part 61, is formed by two-color molding.

The soft part 62 comprises a bottom part 62a at the upper part, and a seal part 62b having an upside down U-shaped cross-section projecting further upward from the bottom part 62a. Since the seal part 62b is elastically deformed so as to be deflected owing to the pressure from the hood panel 3 in the state with the hood panel 3 closed, the air from the engine room is blocked and sealed. Moreover, the cowl louver main body 6 and the hood seal part 60 are formed integrally by two-color molding.

The cowl inner panel 1 comprises a holding part 10 elongating substantially horizontally. A plurality of through holes 11 are provided in the holding part 10 in the direction perpendicular to the paper surface of FIG. 3 with an interval. The hood seal part 60 is held and fixed by the cowl inner panel 1 by fitting the clip part 61b of the hard part 61 in the through holes 11. Moreover, a bead 12 is provided below the holding part 10 for preventing deformation.

Furthermore, a shape keeping member 7 made from a hard resin foamed material is held in the space surrounded by the soft part 62 and the holding part 10.

According to the assembly structure, the distance between the seal part 62b and the holding part 10 is set to be about 60 mm. Ordinarily the hood seal part 60 supports the load of the hood panel 3 owing to the rigidity of the shape keeping member 7 as well as the seal part 62b is elastically contacted with the hood panel 3 for sealing. In the case impact force of a predetermined size or larger is applied on the hood panel 3, the impact force is transmitted to the cowl inner panel 1 via the seal part 62b and the shape keeping member 7. Then, the soft part 62 is elastically deformed as well as the shape keeping member 7 is destroyed so that the further deformation of the hood panel 3 is allowed. Accordingly, the reaction force to be applied from the hood panel 3 onto the opposite party of the collision can be alleviated certainly.

3rd Embodiment

Figure 4:
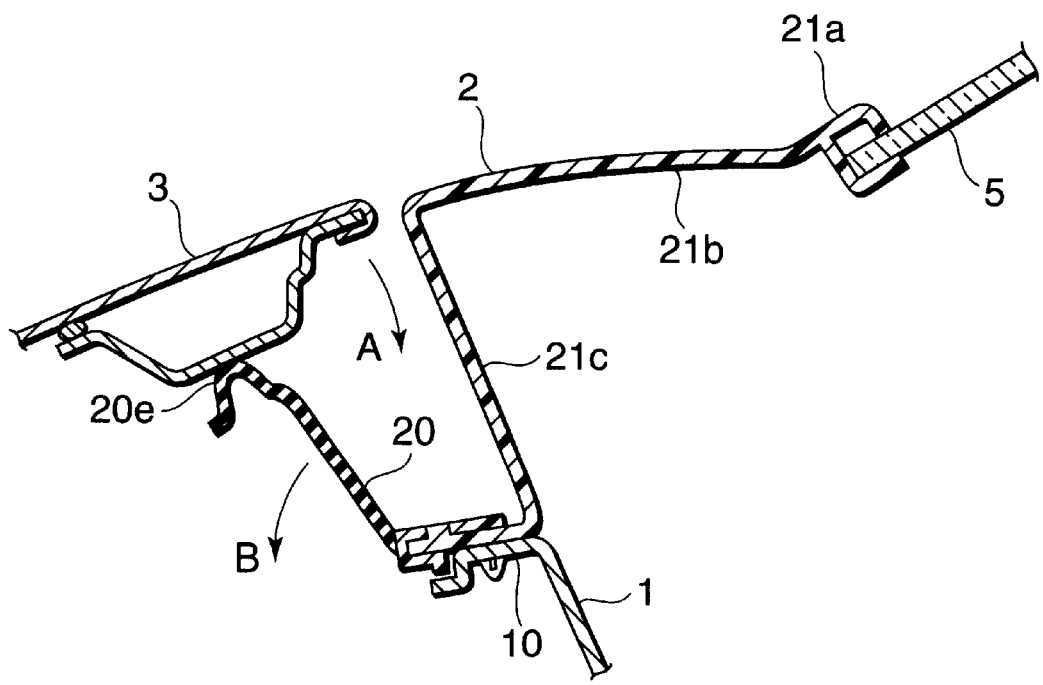
FIG. 4 is a cross-sectional view of an assembly structure for a cowl louver according to a third embodiment of the invention.

FIG. 4 shows an assembly structure according to a third embodiment. The assembly structure is substantially the same as the assembly structure of the first embodiment except that the hood seal part 20 has a different configuration.

The hood seal part 20 is made from a relatively soft resin in the entirety, with one end held by the holding part 10 of the cowl inner panel 1 as well as a seal part 20e formed on the other end. The seal part 20e is elastically contacted with the hood panel 3 for sealing.

According to the assembly structure, ordinarily the hood seal part 20 supports the load of the hood panel 3 owing to the engagement of the engaging projections 21e and the engaging holes 20d as well as the seal part 20e is elastically contacted with the hood panel 3 for sealing. In the case of an impact force of a predetermined size or larger is applied on the hood panel 3, the hood panel 3 is moved in the arrow A direction. When the impact force is transmitted to the hood seal part 20 via the seal part 20e, the hood seal part 20 is elastically deformed in the arrow B direction so as to escape. Therefore, the further downward deformation of the hood panel 3 is allowed so that the reaction force to be applied from the hood panel 3 onto the opposite party of the collision can be alleviated.

4th Embodiment

Figure 5:
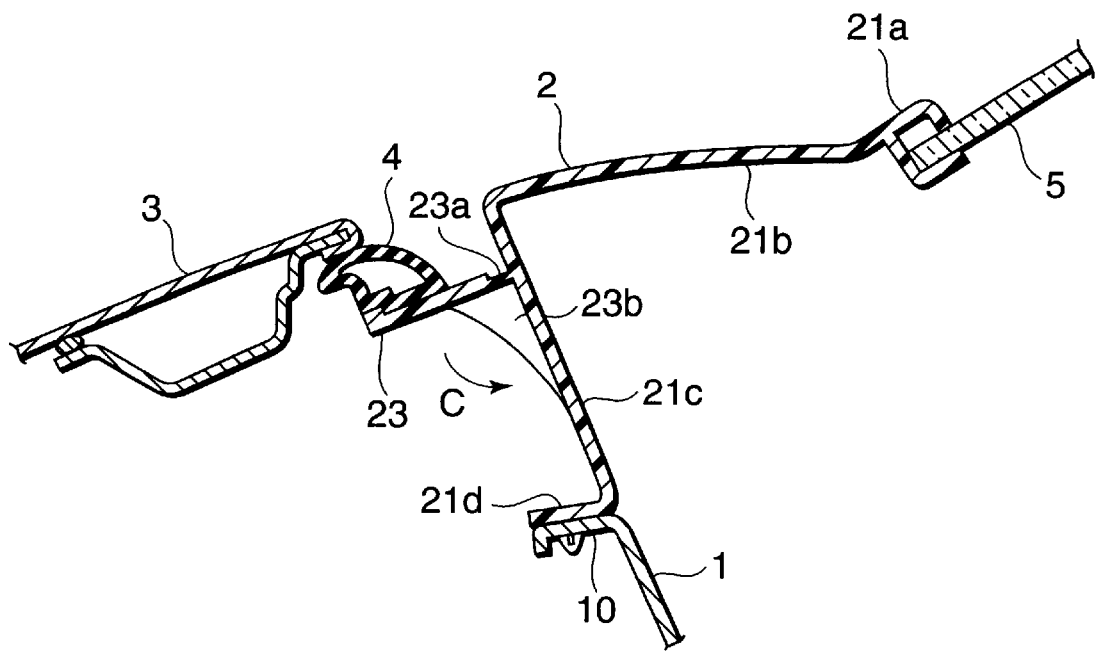
FIG. 5 is a cross-sectional view of an assembly structure for a cowl louver according to a fourth embodiment of the invention.

FIG. 5 shows an assembly structure according to a fourth embodiment. In the assembly structure, the cowl louver main body 2 substantially the same as that of the first embodiment is used.

The cowl louver main body 2 comprises a gripping part 21a for gripping a windshield 5, a flat plate part 21b elongating forward from the gripping part 21a, a tilt part 21c bent substantially by the right angle from the flat plate part 21b, elongating downward, and a rear engaging part 21d elongating forward from the tilt part 21c. Unlike the first embodiment, the through holes 21f are not formed in the engaging part 21d. A hood seal part 23 is formed in a plate-like shape, projecting forward from the middle of the tilt part 21c, with a seal member 4 made from a rubber or a thermoplastic elastomer into a cylinder or an L-shaped cross-section by extrusion molding, held above the hood seal part 23.

The hood seal part 23 is formed integrally with the cowl louver main body 2 from a hard resin, with a thin part 23a formed at the boundary with respect to the tilt part 23c. A reinforcing rib 23b provided continuously with the tilt part 21c is formed below the hood seal part 23.

According to the assembly structure, ordinarily the hood seal part 23 supports the load of the hood panel 3 owing to the reinforcing rib 23b as well as it is elastically contacted with the hood panel 3 for sealing. In the case of impact force of a predetermined size or larger is applied on the hood panel 3, the hood panel 3 is moved in the arrow C direction according to the force. In the case the moment thereof is larger than the strength of the reinforcing rib 23b, the hood seal part 23 is ruptured at the thin part 23a. Accordingly, the further downward deformation of the hood panel 3 is allowed so that the reaction force to be applied from the hood panel 3 onto the opposite party of the collision can be alleviated.

5th Embodiment

Figure 6:
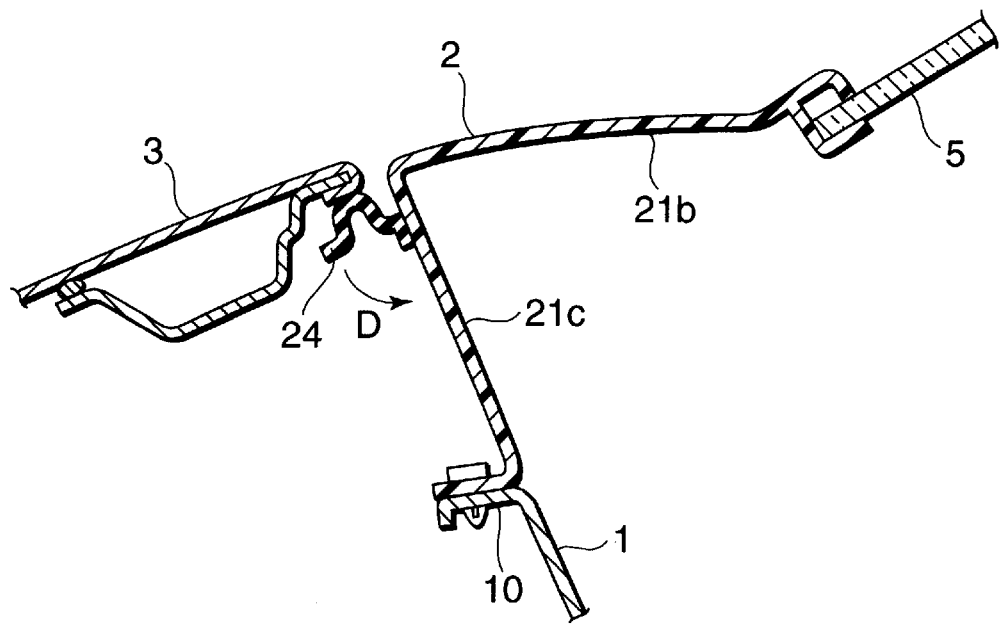
FIG. 6 is a cross-sectional view of an assembly structure for a cowl louver according to a fifth embodiment of the invention.

FIG. 6 shows an assembly structure according to a fifth embodiment. The assembly structure is substantially the same as that of the fourth embodiment except that the hood seal part has a different configuration.

A hood seal part 24 made from a soft resin is projected forward from the middle of the tilt part 21c. The hood seal part 24 is formed so as to have a substantially U-shaped cross-section, with the upper end thereof elastically contacted with the hood panel 3 to serve also as a sealing member. The hood seal part 24 is formed integrally with the cowl louver main body 2 by two-color molding.

According to the assembly structure, ordinarily the hood seal part 24 supports the load of the hood panel 3 as well as it is elastically contacted with the hood panel 3 for sealing. In the case impact force of a predetermined size or larger is applied on the hood panel 3, the hood seal part 24 is pushed in the arrow D direction so as to move in the direction approaching to the tilt part 21c by the force. Accordingly, the further downward deformation of the hood panel 3 is allowed so that the reaction force to be applied from the hood panel 3 onto the opposite party of the collision can be alleviated.

6th Embodiment

Figure 7:
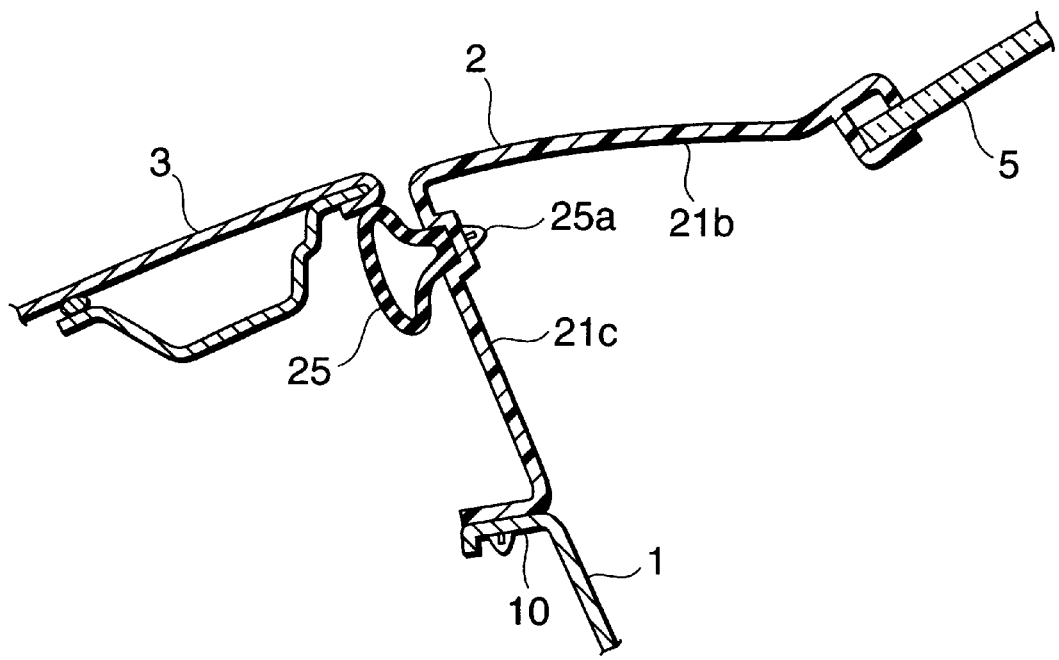
FIG. 7 is a cross-sectional view of an assembly structure for a cowl louver according to a sixth embodiment of the invention.

FIG. 7 shows an assembly structure according to a sixth embodiment. The assembly structure is substantially the same as that of the fourth and fifth embodiments except that the hood seal part has a different configuration.

A hood seal part 25 made from a soft resin is projected forward from the middle of the tilt part 21c. The hood seal part 25 is formed so as to have a substantially cylindrical shape by extrusion molding, and is fixed with the tilt part 21c by a clip 25a. The upper end of the hood seal part 25 is elastically contacted with the hood panel 3 to serve also as a sealing member.

According to the assembly structure, ordinarily the hood seal part 25 supports the load of the hood panel 3 as well as it is elastically contacted with the hood panel 3 for sealing. In the case of an impact force of a predetermined size or larger is applied on the hood panel 3, the hood seal part 25 is pushed and elastically deformed so as to be crushed or dropped off from the rear tilt part 21c by the force so that the further downward deformation of the hood panel 3 is allowed, and thus the reaction force to be applied from the hood panel 3 onto the opposite party of the collision can be alleviated.

7th Embodiment

Figure 8:
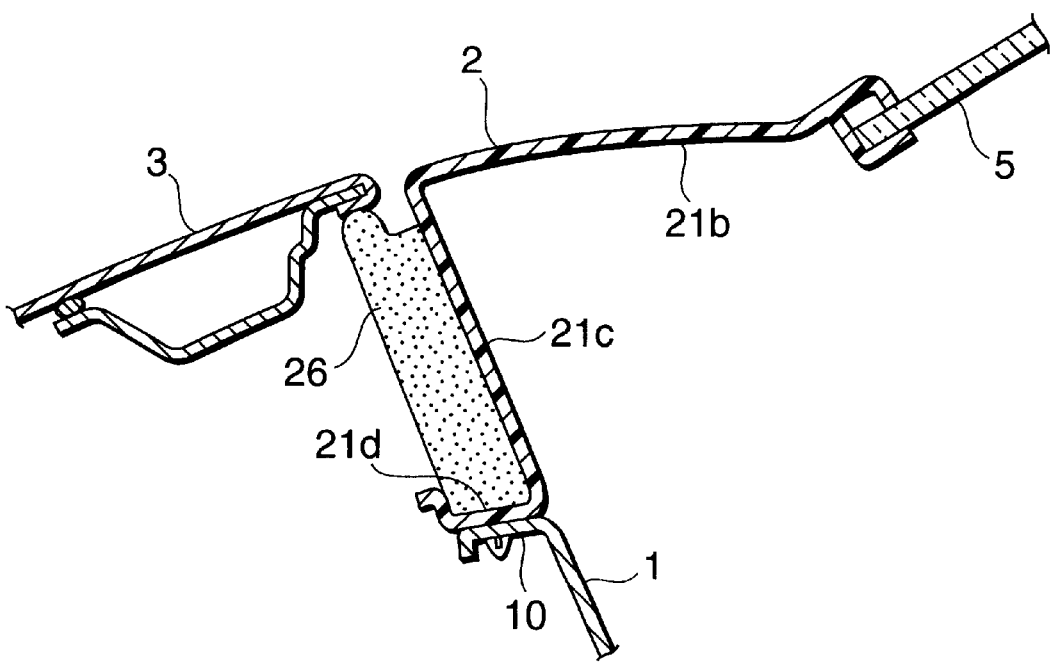
FIG. 8 is a cross-sectional view of an assembly structure for a cowl louver according to a seventh embodiment of the invention.

FIG. 8 shows an assembly structure according to a seventh embodiment. The assembly structure is substantially the same as that of the fourth embodiment except that the hood seal part has a different configuration.

According to the assembly structure of this embodiment, a thick plate-like hood seal part 26 made from a soft foamed urethane is contacted and held between the engaging part 21d of the cowl louver main body 2 and the tilt part 21c. The upper end part of the hood seal part 26 is elastically contacted with the hood panel 3 to serve also as a sealing member.

According to the assembly structure, ordinarily the hood seal part 26 supports the load of the hood panel 3 as well as it is elastically contacted with the hood panel 3 for sealing. In the case of an impact force of a predetermined size or larger is applied on the hood panel 3, the hood seal part 26 is pushed and elastically deformed so as to be crushed by the force. Accordingly, the further downward deformation of the hood panel 3 is allowed so that the reaction force to be applied from the hood panel 3 onto the opposite party of the collision can be alleviated.

8th Embodiment

Figure 9:
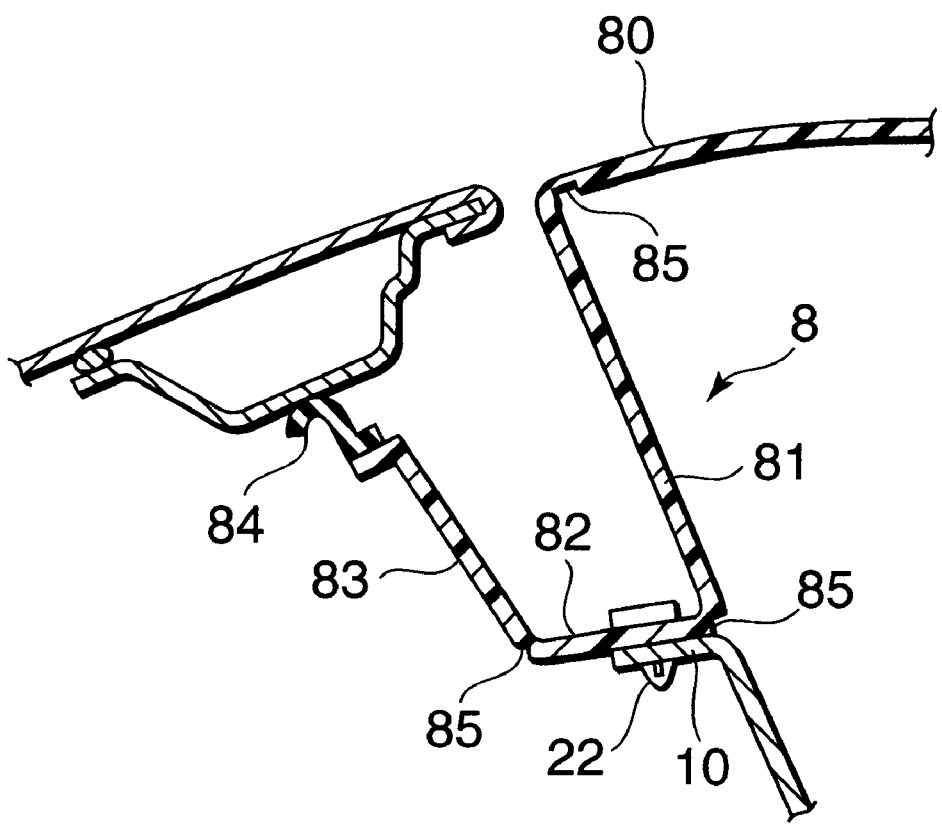
FIG. 9 is a cross-sectional view of an assembly structure for a cowl louver according to an eighth embodiment of the invention.

FIG. 9 shows an assembly structure according to an eighth embodiment. The assembly structure is substantially the same as that of the first embodiment except that the cowl louver main body 2 and the hood sea part 20 are formed integrally.

According to the assembly structure of this embodiment, a cowl louver main body 8 made from a polypropylene comprises a gripping part (not illustrated) for gripping a windshield, a flat plate part 80 elongating forward from the gripping part, a rear tilt part 81 bent substantially by the right angle from the flat plate part 80, elongating downward, an engaging part 82- elongating forward from the rear tilt part 81, and a front tilt part 83 bent substantially by the right angle from the rear engaging part 82, elongating upward. A seal part 84 made from a soft resin, disposed at the tip end of the front tilt part 83, to be elastically contacted with the hood panel 3 is formed integrally with the cowl louver main body 8 by two-color molding. The engaging part 82 is fixed with the holding part 10 by a clip 22.

A notch 85 is formed each at the boundary part between the flat plate part 80 and the rear tilt part 81, the boundary part between the rear tilt part 81 and the engaging part 82, and the boundary part between the engaging part 82 and the front tilt part 83.

Accordingly to the assembly structure, ordinarily the cowl louver main body 8 supports the load of the hood panel 3 as well as the seal part 84 is elastically contacted with the hood panel 3 for sealing. In the case of an impact force of a predetermined size or larger is applied on the hood panel 3, the cowl louver main body 8 is pushed and deformed by the force so that the stress there of is concentrated on the notches 85, and thus the cowl louver main body 8 is ruptured at any of the notches 85. Accordingly, the further downward deformation of the hood panel 3 is allowed so that the reaction force to be applied from the hood panel 3 onto the opposite party of the collision can be alleviated.

It is also possible to form the notch 85 in the middle of the rear tilt part 81 so as to allow the further downward deformation of the hood panel 3 by the bend of the rear tilt part 81 into an L-shaped cross-section.

9th Embodiment

Figure 10:
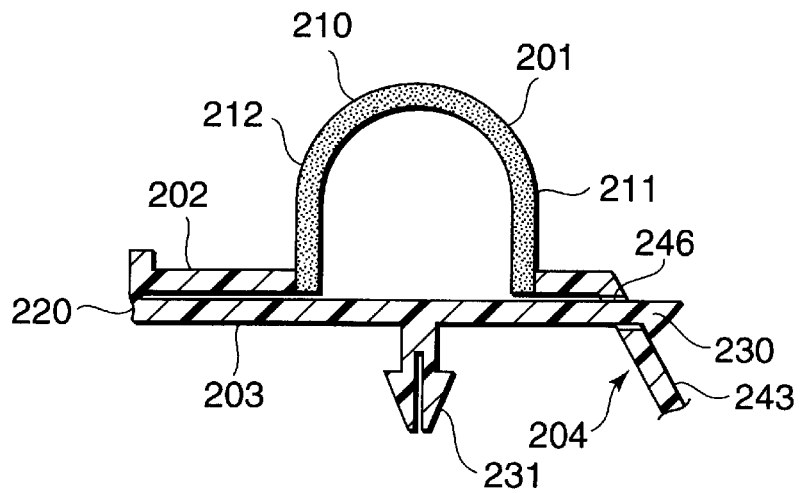
FIG. 10 is a principal part cross-sectional view of a seal member for a cowl louver according to a ninth embodiment of the invention.

FIG. 10 shows a seal member for a cowl louver according to a ninth embodiment of the invention. FIG. 10 is a cross-sectional view of a cowl louver having the seal member mounted on the car body. The seal member comprises a seal main body 201, a flat plate part 202, an integral hinge 220, and a reinforcing plate 203, integrally formed with a cowl louver 204.

The seal main body 201 made from a polyolefin-based elastomer foamed material in a longitudinal shape with a U-shaped cross-section, comprises a head part 210 having an arc-like cross-section, and a pair of leg parts 211, 212 elongating parallel from both sides of the head part 210. One of the leg parts 211 is fixed on the tip end face of the cowl louver 204, and the other leg part 212 is fixed on the end face of the flat plate part 202. It is formed longer than the tip end length of the cowl louver 204 so as to be bent substantially by the right angle at both ends of the cowl louver so as to serve as a fender seal.

The flat plate part 202 made from a polypropylene elongates along the tip end of the cowl louver 204.

The reinforcing plate 203 made from a polypropylene elongates parallel along the tip end of the cowl louver 204. Engaging projections 230 formed at the tip end thereof are disposed in a plurality in the direction perpendicular to the paper surface with an interval. Moreover, elastically deformable engaging nails 231 formed on the lower surface of the reinforcing plate 203 are disposed in a plurality in the direction perpendicular to the paper surface.

Figure 11:
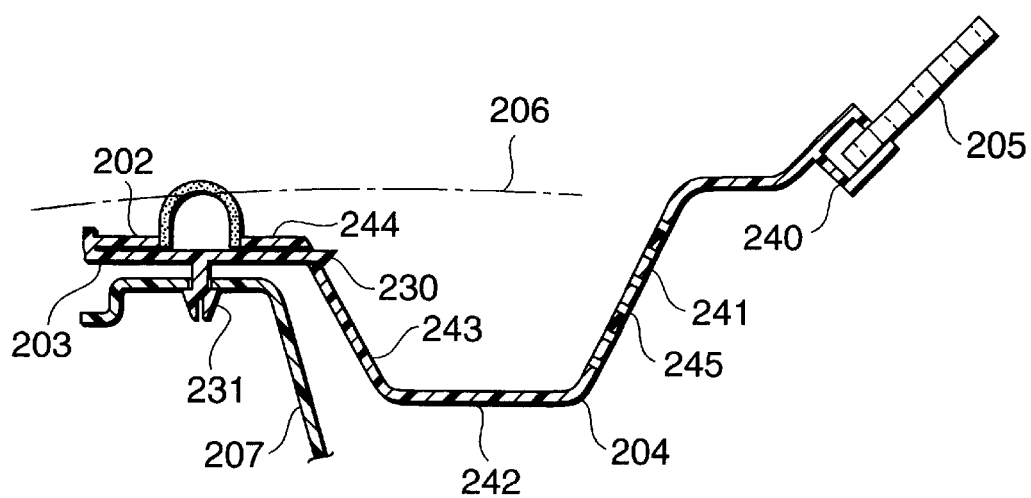
FIG. 11 is a principal part cross-sectional view showing the state with the seal member for a cowl louver according to the ninth embodiment of the invention assembled in an automobile.

In FIG. 11 the cowl louver 204 made from a polypropylene comprises a gripping part 240 to be held by a windshield 205, a first tilt surface 241 inclined obliquely downward to the front direction, to be exposed in the state with the hood 206 closed, a bottom part 242 elongating forward from the first tilt surface 241, a second tilt surface 243 elongating obliquely upward from the bottom part 242, and a horizontal part 244 elongating horizontally from the second tilt second surface 243. A large number of small holes 245 are formed in the first tilt surface 241 for introducing the outside air into the car room. Moreover, engaging holes 246 are formed in the second tilt surface 243 in the direction perpendicular to the paper surface with an interval.

The flat plate part 202 and the reinforcing plate 203 are interlocked by the integral hinge 220 such that the reinforcing plate 203 bent at the integral hinge 220 so as to be inverted is held and fixed by engaging the engaging projections 230 with the engaging holes 246.

Figure 12:
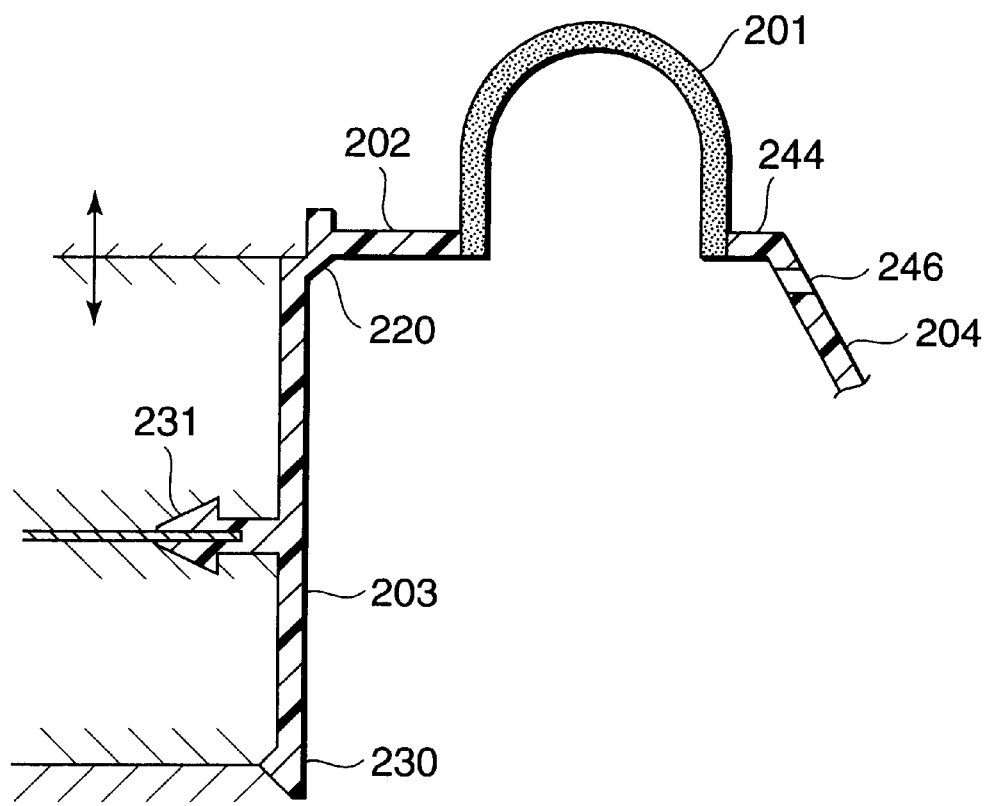
FIG. 12 is an explanatory cross-sectional view for describing a molding method of the seal member for a cowl louver according to the ninth embodiment of the invention.

In the seal member according to this embodiment, the seal main body 201, the flat plate part 202, the integral hinge 220, the reinforcing plate 203 and the cowl louver 204 are molded integrally. In the absence of the seal main body 201 as shown in FIG. 12, the flat plate part 202, the integral hinge 220, the reinforcing plate 203 and the cowl louver 204 are formed by injection molding. The reinforcing plate 203 is molded at a position orthogonal to the flat plate part 202 via the integral hinge 220. Accordingly, the parting direction is as shown by the arrow in FIG. 12 so that the undercut of the engaging projections 230 and the engaging nails 231 can be avoided. A slide core is used for forming the engaging nails 231 and the engaging holes 246.

With the compact disposed in the mold, the movable mold is replaced for forming the seal main body 201. Accordingly, the seal main body 201 can be formed in the state integrally fused with the end face of the horizontal part 244 of the cowl louver 204 and the end face of the flat plate part 202.

By opening the mold for taking out the obtained compact, bending the integral hinge 220 so as to move the reinforcing plate 203 for covering the opening of the seal main body 201, and fitting the engaging projections 230 in the engaging holes 246, the seal member of this embodiment can be provided. The fitting operation of the engaging projections 230 in the engaging holes 246 can be facilitated by elastically deforming the seal main body 201 in the direction for spreading the opening.

The cowl louver 204 having the seal member of this embodiment is fixed on the car body by the gripping part 240 on one end held by the windshield 205, and the engaging nails 231 of the reinforcing plate 203 on the other end engaged and held by the cowl inner panel 207. When the hood 206 is closed, the seal main body 201 is elastically deformed according to the pressure from the hood 206 so as to be contacted elastically with the hood 206 according to the restoration force of both shape and material of the seal main body 201. Accordingly, introduction of the heat and the noise from the engine room into the car room through the small holes 245 can be prevented so as to realize a high sealing property.

Since the seal main body 201 can be cylindrical with the reinforcing plate 203 so as to limit the spread of the opening certainly, the restoration force by the shape of the seal main body 201 can be maintained even in the case heat deterioration is generated in the seal main body 201, and thus deterioration of the sealing property can be prevented. Moreover, since the seal main body 201 is formed integrally with the cowl louver 204 as well as the engaging nails 231 are provided integrally with the reinforcing plate 203, an adhesive double coated tape or a clip used in the conventional embodiment can be eliminated so that the number of steps in assembly can be reduced drastically.

10th Embodiment

Figure 13:
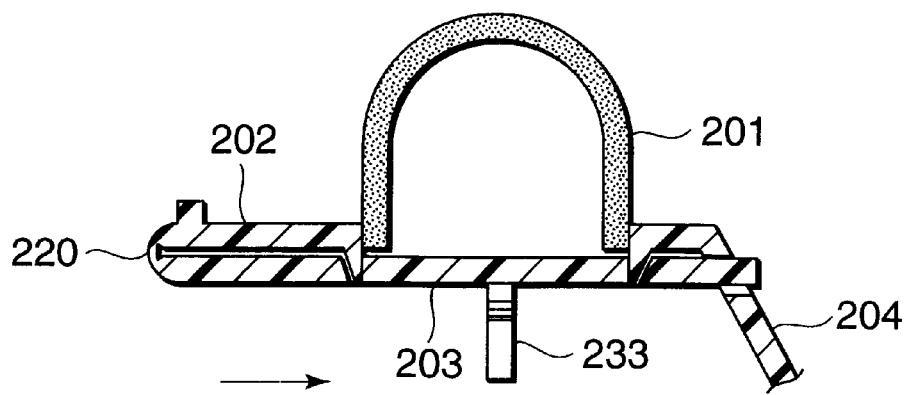
FIG. 13 is a principal part cross-sectional view of a seal member for a cowl louver according to a tenth embodiment of the invention.
Figure 14:
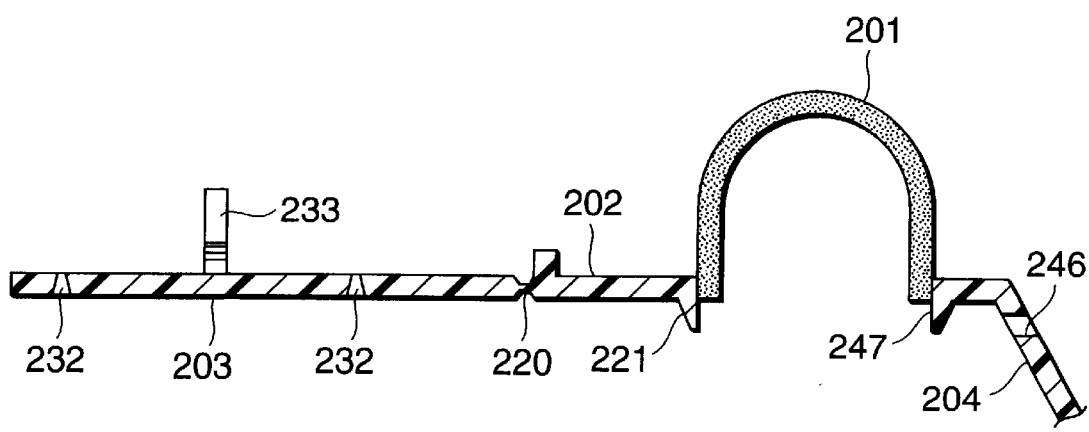
FIG. 14 is an explanatory cross-sectional view for describing the shape of the seal member for a cowl louver immediately after molding according to the tenth embodiment of the invention.

FIGS. 13 and 14 show a seal member according to a tenth embodiment. Like the ninth embodiment, the seal member comprises a seal main body 201, a flat plate part 202, an integral hinge 220, a reinforcing plate 203, and a cowl louver 204. It is integrally molded with the same materials as the ninth embodiment in the substantially same configuration as the ninth embodiment.

A plurality of projections 221 having a wedge-like cross-section are provided on the end part of the flat plate part 202 fixed with the seal main body 201 in the direction perpendicular to the paper surface with an interval, projecting to the opposite side with respect to the seal main body 201. Moreover, a plurality of projections 247 having a wedge-like cross-section are provided on the end part of the horizontal part 244 of the cowl louver 204 fixed with the seal main body 201 in the direction perpendicular to the paper surface with an interval, projecting to the opposite side with respect to the seal main body 201. Furthermore, a plurality of through holes 232 having a wedge-like cross-section are provided in the reinforcing plate 203 in the direction perpendicular to the paper surface with an interval such that the projections 221 and the projections 247 can be fitted into the through holes 232.

Figure 15:
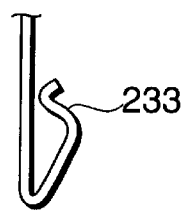
FIG. 15 is a side view of an engaging nail of the seal member for a cowl louver according to the tenth embodiment of the invention.
Figure 16:
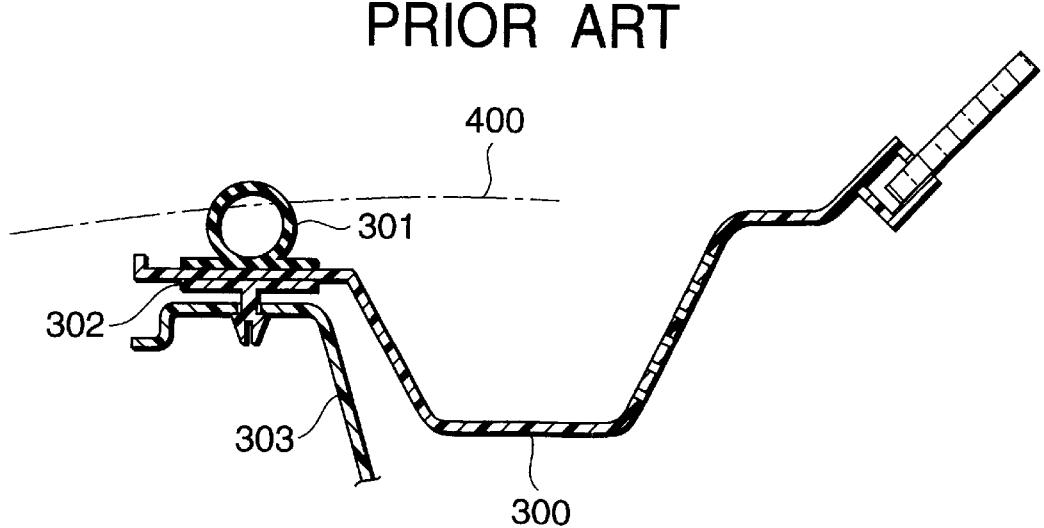
FIG. 16 is a principal part cross-sectional view showing the state with a conventional seal member for a cowl louver assembled in an automobile.
Figure 17:
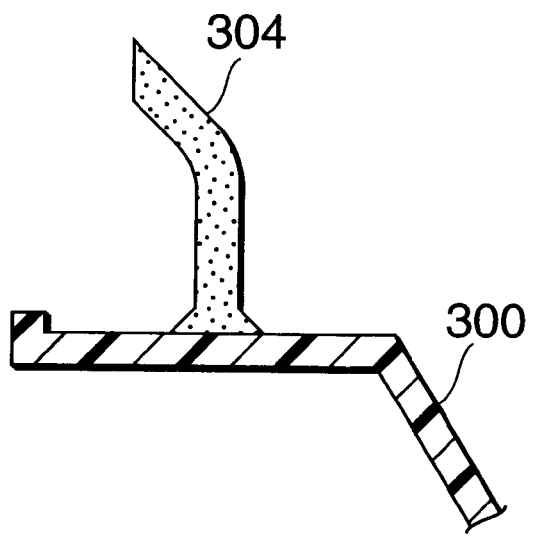
FIG. 17 is a cross-sectional view of the conventional seal member for a cowl louver.
Figure 18:
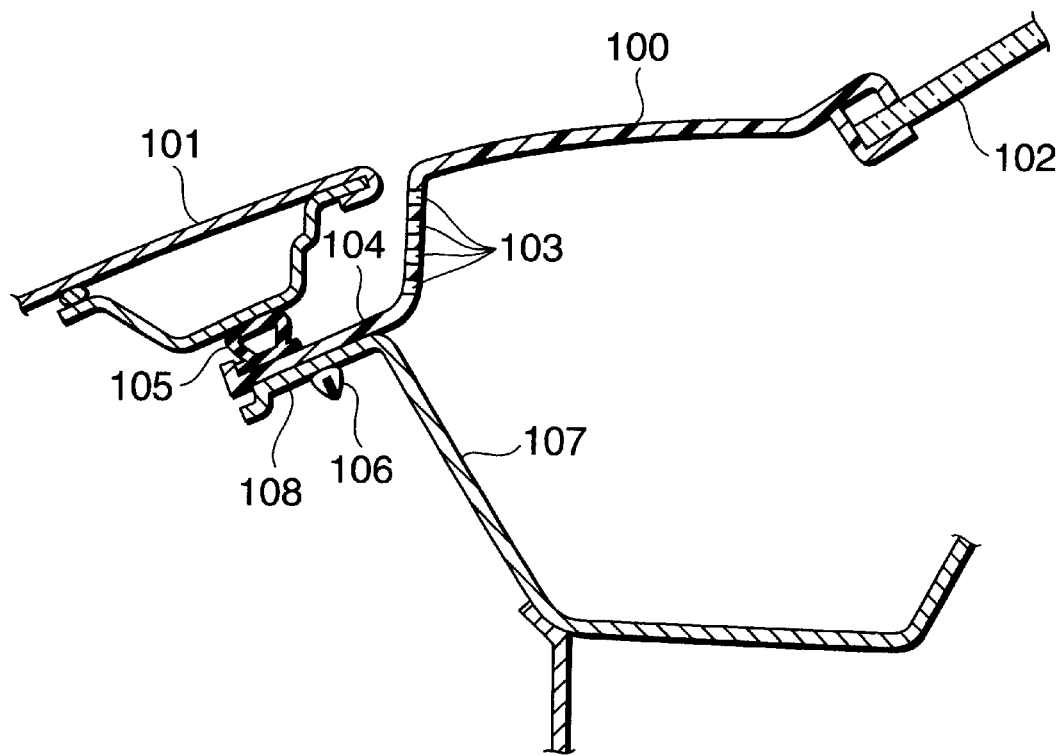
FIG. 18 is a cross-sectional view of a conventional assembly structure for a cowl louver.

The engaging projections 230 are not provided on the tip end of the reinforcing plate 203. The end part of the reinforcing plate 203 is inserted through the engaging holes 246. A plurality of elastically deformable engaging nails 233 are formed on the lower surface of the reinforcing plate in the direction perpendicular to the paper surface with an interval. The engaging nails 233, which function in the same way as the engaging nails 231 in the first embodiment, have a side shape as shown in FIG. 15.

As shown in FIG. 14, the seal member can be molded with the reinforcing plate 203 in the state parallel with the flat plate part 202. Accordingly, the engaging nails 233, the through holes 232, the projections 221 and the projections 247 can be molded easily with a slide core without the risk of undercut.

After molding, by inverting the reinforcing plate 203 by bending at the integral hinge 220, inserting the tip end of the reinforcing plate 203 through the engaging holes 246 with the seal main body 201 elastically deformed, and fitting the projections 221 and the projections 247 into the through holes 232, the reinforcing plate 203 is positioned and fixed. Accordingly, the opening shape of the seal main body 201 can be limited certainly so that the deformation of the opening can be limited certainly as well.

According to an assembly structure for a cowl louver of the invention, drastic deformation of a hood panel is allowed in the case large force is applied on the hood panel. Therefore, the reaction force to be applied from the hood panel onto the opposite party of the collision can be alleviated so as to improve the safety.

According to a seal member for a cowl louver of the invention, since it can be molded integrally with the cowl louver, the number of steps in assembly can be reduced drastically according to reduction of the number of components. Moreover, since the restoration force can be realized by both shape and material, deterioration of the sealing property due to heat deterioration can be prevented.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An assembly structure for a cowl louver, comprising:
   a cowl inner panel having a holding part;
   a cowl louver main body adapted to hold a windshield and being held by said holding part; and
   a hood seal part having a soft seal member to be contacted elastically with a lower surface of a hood panel and held by said cowl louver main body,
   wherein said holding part is disposed below said hood seal part away therefrom, and a portion of said hood seal part is spaced from the lower surface of the hood panel and wherein the soft seal member is configured to elastically deform and the hood seal part is configured to elastically rotate about a rear engaging part of said cowl louver main body in an obliquely downward direction so as to reduce a deformation load on the hood panel when a downward force of a predetermined size or larger is applied to the hood panel.

2. An assembly structure for a cowl louver according to claim 1, wherein said hood seal part is held by said cowl louver main body such that said hood seal part is detached from said cowl louver main body by an impact force of a predetermined size or larger from the hood panel so as to allow movement of the hood panel.

3. An assembly structure for a cowl louver according to claim 1, wherein said hood seal part is made from a soft material such that said hood seal part is bent drastically by an impact force of a predetermined size or larger from the hood panel so as to allow movement of the hood panel.

4. An assembly structure for a cowl louver according to claim 1, wherein said hood seal part is made from a soft material such that said hood seal part is deformed drastically by an impact force of a predetermined size or larger from the hood panel so that the hood panel is moved over said hood seal part.

5. An assembly structure for a cowl louver according to claim 4, wherein said hood seal part is compressed drastically by the impact force of a predetermined size or larger from the hood panel so as to allow a movement of the hood panel.

6. An assembly structure for a cowl louver according to claim 1, wherein a shape of said cowl louver main body does not interfere with the hood panel when the hood panel is deformed.

7. An assembly structure for a cowl louver, comprising:
a cowl inner panel having a holding part;
a cowl louver main body held by said holding part; and
a hood seal part having a soft seal member to be contacted elastically with a lower surface of a hood panel and held by said cowl louver main body,
wherein said holding part is disposed below said hood seal part away therefrom, and a portion of said hood seal part is elastically deformed so as to reduce a deformation load on the hood panel when a downward force of a predetermined size or larger is applied to the hood panel,
wherein the hood seal part and the cowl louver main body are integrated by engaging a rear engaging part of the cowl louver main body between a front engaging part of the hood seal part, and engaging projections of the cowl louver main body are fitted into engaging holes of the hood seal part, and
wherein application of the downward force of a predetermined size or larger disengages the engaging projections and engaging holes.

8. An assembly structure for a cowl louver, comprising:
a cowl inner panel having a holding part;
a cowl louver main body adapted to hold a windshield and being held by said holding part; and
a hood seal part elastically coupled to the cowl louver main body, the hood seal part having a sealing portion configured to be contacted elastically with a lower surface of a hood panel and a soft portion,
wherein the sealing portion and the soft portion are configured to elastically deform in an obliquely downward direction when a downward force of a predetermined size or larger is applied to the hood panel so as to reduce a deformation load on the hood panel.

9. An assembly structure for a cowl louver as in claim 8, further comprising a shape keeping member operatively associated with the soft portion of the hood seal part so as to allow further elastic deformation of the soft portion when a downward force of a predetermined size or larger is applied to the hood panel.

10. An assembly structure for a cowl louver, comprising:
a cowl inner panel having a holding part;
a cowl louver main body adapted to hold a windshield and being supported on said holding part; and
a hood seal part mounted on said cowl louver main body and configured to be contacted elastically with a lower surface of a hood panel,
wherein said holding part is disposed below said hood seal part away therefrom, and a portion of said hood seal part is spaced from the lower surface of the hood panel and wherein the hood seal part is configured to elastically deform in an obliquely downward direction when a downward force of a predetermined size or larger is applied to the hood panel so as to reduce a deformation load on the hood panel.

11. An assembly structure for a cowl louver as in claim 10, wherein the hood seal part has a substantially U-shaped cross section.

12. An assembly structure for a cowl louver as in claim 10, wherein the hood seal part has a substantially cylindrical shaped cross section.

13. An assembly structure for a cowl louver as in claim 10, wherein the hood seal part is fixed to a tilt portion of the cowl louver main body.

14. An assembly structure for a cowl louver as in claim 13, further comprising a clip to fixedly attach the hood seal part to the tilt portion.

15. An assembly structure for a cowl louver, comprising:
a cowl inner panel having a holding part;
a cowl louver main body adapted to hold a windshield and being supported on said holding part; and
a hood seal part coupled to said cowl louver main body, the hood seal part having a soft seal member configured to be contacted elastically with a lower surface of a hood panel coupled thereto and the hood seal part having a thin part coupled to said cowl louver main body to be disposed between said cowl louver main body and said soft seal member,
wherein said holding part is disposed below said hood seal part away therefrom, and the thin part of said hood seal part is spaced from the lower surface of the hood panel and wherein the thin part allows the hood seal part to move in an obliquely downward direction when a downward force of a predetermined size or larger is applied to the hood panel so as to reduce a deformation load on the hood panel.

16. An assembly structure for a cowl louver as in claim 15, further comprising a reinforcement structure positioned between the cowl louver main body and the hood seal part and configured to reinforce at least the hood seal part.

17. An assembly structure for a cowl louver, comprising:
a cowl inner panel having a holding part;
a cowl louver main body adapted to hold a windshield and being held by said holding part; and a hood seal part comprising a foam sealing portion contacted elastically with a lower surface of a hood panel and held by said cowl louver main body, wherein said holding part is disposed below said hood seal part away therefrom, and a portion of said hood seal part is spaced from the lower surface of the hood panel and is elastically deformed in an obliquely downward direction so as to reduce a deformation load on the hood panel when a downward force of a predetermined size or larger is applied to the hood panel.

* * * * *